US012683214B2

(12) United States Patent
Vuylsteke et al.

(10) Patent No.: US 12,683,214 B2
(45) Date of Patent: Jul. 14, 2026

(54) THERMAL MANAGEMENT SYSTEM AND METHOD FOR DC FAST CHARGE

(71) Applicant: Ford Global Technologies, LLC, Dearborn, MI (US)

(72) Inventors: Gabrielle Vuylsteke, Ferndale, MI (US); Jordan Mazaira, Taylor, MI (US); Ashley Wiese, Ann Arbor, MI (US); Angel Porras, Dearborn, MI (US); Julia Helen Buckland Seeds, Wolverine Lake, MI (US); Hao Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 642 days.

(21) Appl. No.: 18/333,241

(22) Filed: Jun. 12, 2023

(65) Prior Publication Data

US 2024/0413424 A1 Dec. 12, 2024

(51) Int. Cl.
| | |
|---|---|
| *H01M 10/633* | (2014.01) |
| *B60K 11/02* | (2006.01) |
| *B60L 53/10* | (2019.01) |
| *B60L 58/26* | (2019.01) |
| *H01M 10/613* | (2014.01) |
| *H01M 10/625* | (2014.01) |
| *H01M 10/635* | (2014.01) |

(52) U.S. Cl.
CPC ........... *H01M 10/633* (2015.04); *B60L 58/26* (2019.02); *H01M 10/613* (2015.04); *H01M 10/625* (2015.04); *H01M 10/635* (2015.04); *B60K 11/02* (2013.01); *B60L 53/11* (2019.02); *B60L 2240/545* (2013.01); *H01M 2220/20* (2013.01)

(58) Field of Classification Search
CPC ............. H01M 10/633; H01M 10/613; H01M 10/625; H01M 10/635; H01M 2220/20; B60L 58/26; B60L 53/11; B60L 2240/545; B60L 58/12; B60L 2260/56; B60L 2240/662; B60K 11/02; Y02T 10/70
USPC ......................................................... 320/150
See application file for complete search history.

(56) References Cited

U.S. PATENT DOCUMENTS

| | | | |
|---|---|---|---|
| 9,114,794 B2 | 8/2015 | King et al. | |
| 9,676,283 B2 | 6/2017 | Jackson et al. | |
| 10,286,807 B2 | 5/2019 | Christen et al. | |
| 10,744,885 B2 | 8/2020 | Jammoul et al. | |
| 10,870,368 B2 | 12/2020 | Ing et al. | |
| 11,043,834 B2 | 6/2021 | Manzoor et al. | |
| 11,161,428 B2 * | 11/2021 | Wang ...................... B60L 53/62 | |

(Continued)

FOREIGN PATENT DOCUMENTS

| | | | | |
|---|---|---|---|---|
| DE | 102022130607 A1 * | 9/2023 | ............. | B60L 58/26 |
| JP | 2012050291 A * | 3/2012 | ............. | Y02E 60/10 |
| KR | 101394732 B1 * | 5/2014 | ........ | H01M 8/04768 |

*Primary Examiner* — M Baye Diao
(74) *Attorney, Agent, or Firm* — McCoy Russell LLP

(57) ABSTRACT

Systems and methods for cooling an electric energy storage device of an electric vehicle are described. In one example, a temperature of a traction battery is predicted and an opportunity assessment is generated, where the opportunity assessment is based on the temperature of the traction battery being predicted to exceed a threshold temperature, where the temperature of the traction battery is predicted prior to a traction battery DC fast charging event, and where the temperature of the traction battery based on time and a segment of a travel route.

20 Claims, 6 Drawing Sheets

(56)  References Cited

U.S. PATENT DOCUMENTS

| | | | |
|---|---|---|---|
| 11,757,145 | B2 | 9/2023 | Wiese et al. |
| 12,508,952 | B2 * | 12/2025 | Kim .................. B60H 1/00278 |
| 2018/0072181 | A1 | 3/2018 | Christen et al. |
| 2019/0299791 | A1 * | 10/2019 | Gonze .................. H01M 10/66 |
| 2020/0047586 | A1 * | 2/2020 | Gonze ............... B60H 1/00385 |
| 2021/0031654 | A1 | 2/2021 | Vizzini et al. |
| 2022/0250506 | A1 | 8/2022 | Goldman-Shenhar et al. |
| 2022/0260641 | A1 | 8/2022 | Yoon |
| 2024/0067049 | A1 * | 2/2024 | Kim .................. B60H 1/00278 |

* cited by examiner

THERMAL MANAGEMENT SYSTEM AND METHOD FOR DC FAST CHARGE

FIELD

The present description relates to a method and system for operating an electric vehicle.

BACKGROUND

An electric machine may include a thermal management system to control a temperature of an electric energy storage device, such as a battery. The thermal management system may have capacity to cool a battery, but its cooling capacity may be less than the battery's capacity to generate heat. For example, the thermal management system may have less capacity to cool a battery than may be desired when a vehicle is traveling on a downhill grade and vehicle brakes are being applied. As such, there may be times when a temperature of the battery exceeds a threshold level. In order to avoid a possibility of battery degradation, a capacity of the battery to sink or source electric current may be de-rated. However, de-rating the battery may reduce vehicle performance and it may increase battery charging time.

The inventors herein have recognized the above-mentioned issues and have developed a method for thermal management of a traction battery, comprising: prior to a traction battery charging event, predicting a temperature of the traction battery before and after the battery charging event; generating a confidence level for the temperature of the traction battery that is predicted; and adjusting cooling of the traction battery in response to the temperature of the traction battery that is predicted and the confidence level.

By predicting a battery temperature before a traction battery begins to be charged, it may be possible to cool the battery before charging so that the battery may accept charge at a higher rate. Additionally, pre-cooling the battery may allow a vehicle that includes the battery to exhibit a higher level of performance after the battery is charged due to a lower battery temperature at the time of vehicle drive away. In one example, the level of battery cooling may be adjusted according to a predicted battery temperature after fast charging the battery.

The present description may provide several advantages. In particular, the approach may improve vehicle drivability. Further, the approach may reduce a possibility of a battery exceeding a threshold temperature, thereby reducing a possibility of battery degradation. Additionally, the approach may be performed in cooperation with a cloud server so as to reduce computational load on vehicle controllers.

The above advantages and other advantages, and features of the present description will be readily apparent from the following Detailed Description when taken alone or in connection with the accompanying drawings.

The summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
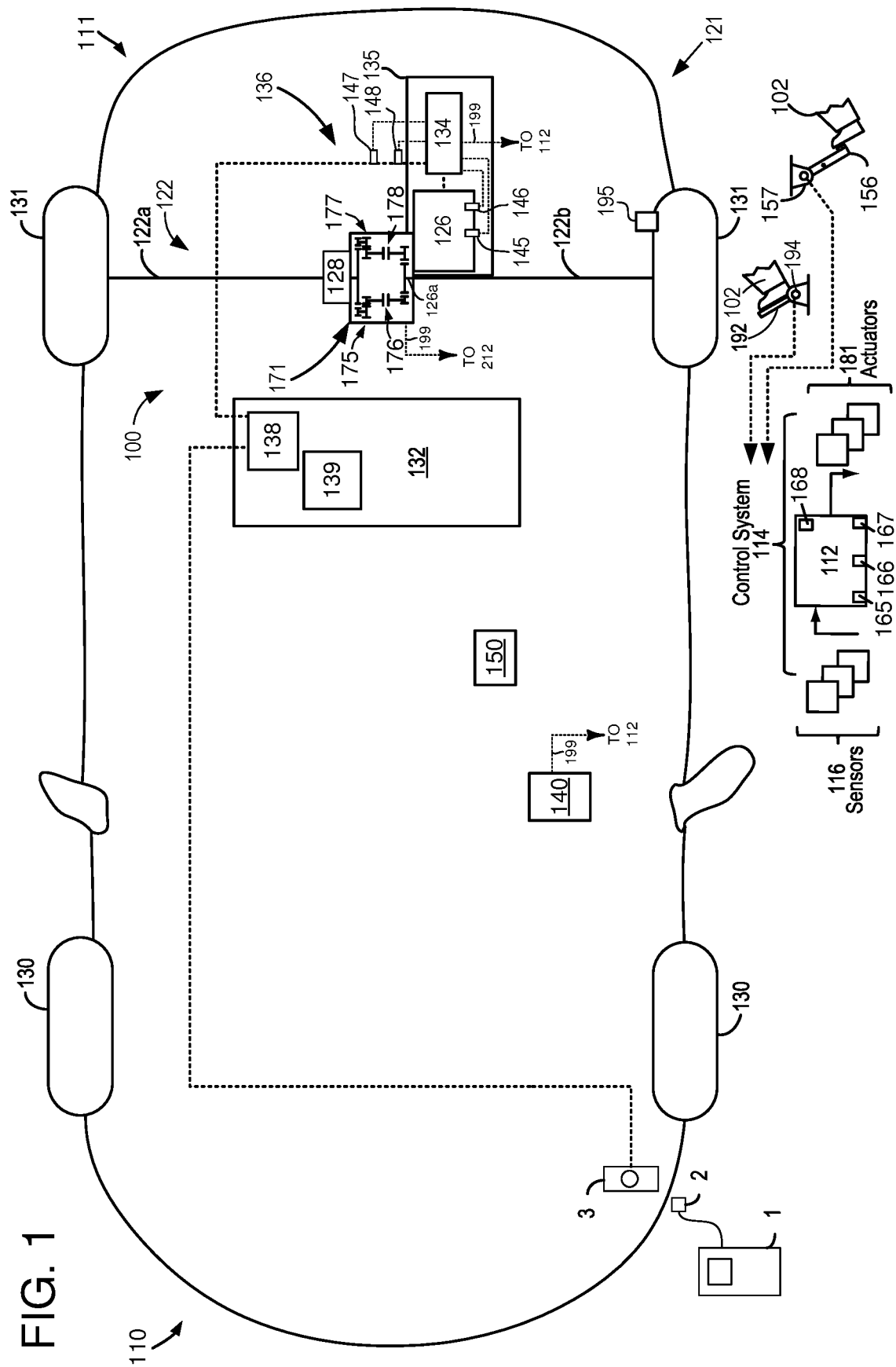
FIG. 1 is a schematic diagram of a vehicle that includes an electric energy storage device and an electric machine for propulsion.
Figure 2:
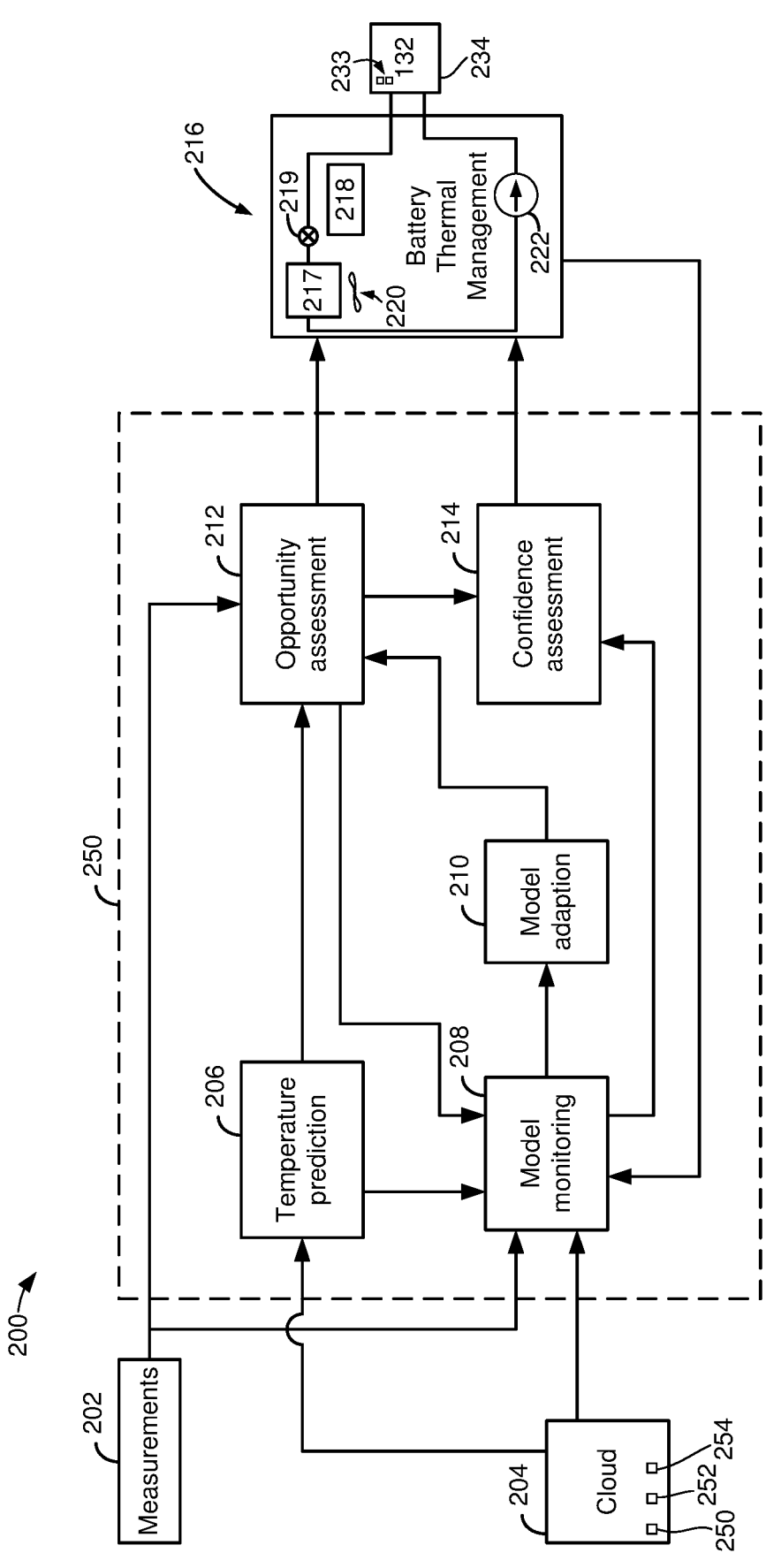
FIG. 2 is a block diagram of a cloud based cooling approach for an electric energy storage device.
Figure 3:
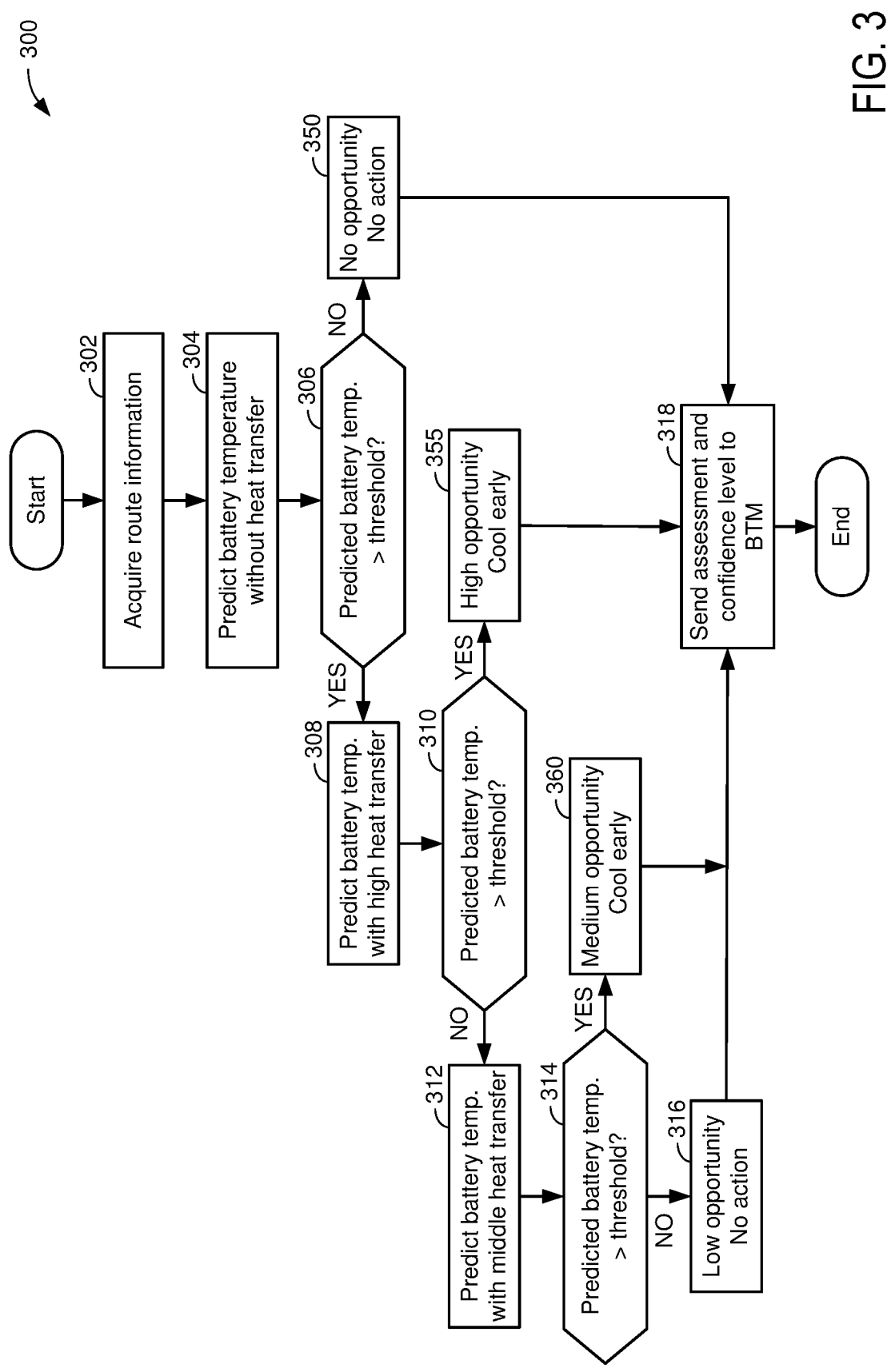
FIG. 3 is a flowchart of a method for estimating possibility of a traction battery exceeding a threshold temperature.
Figure 4:
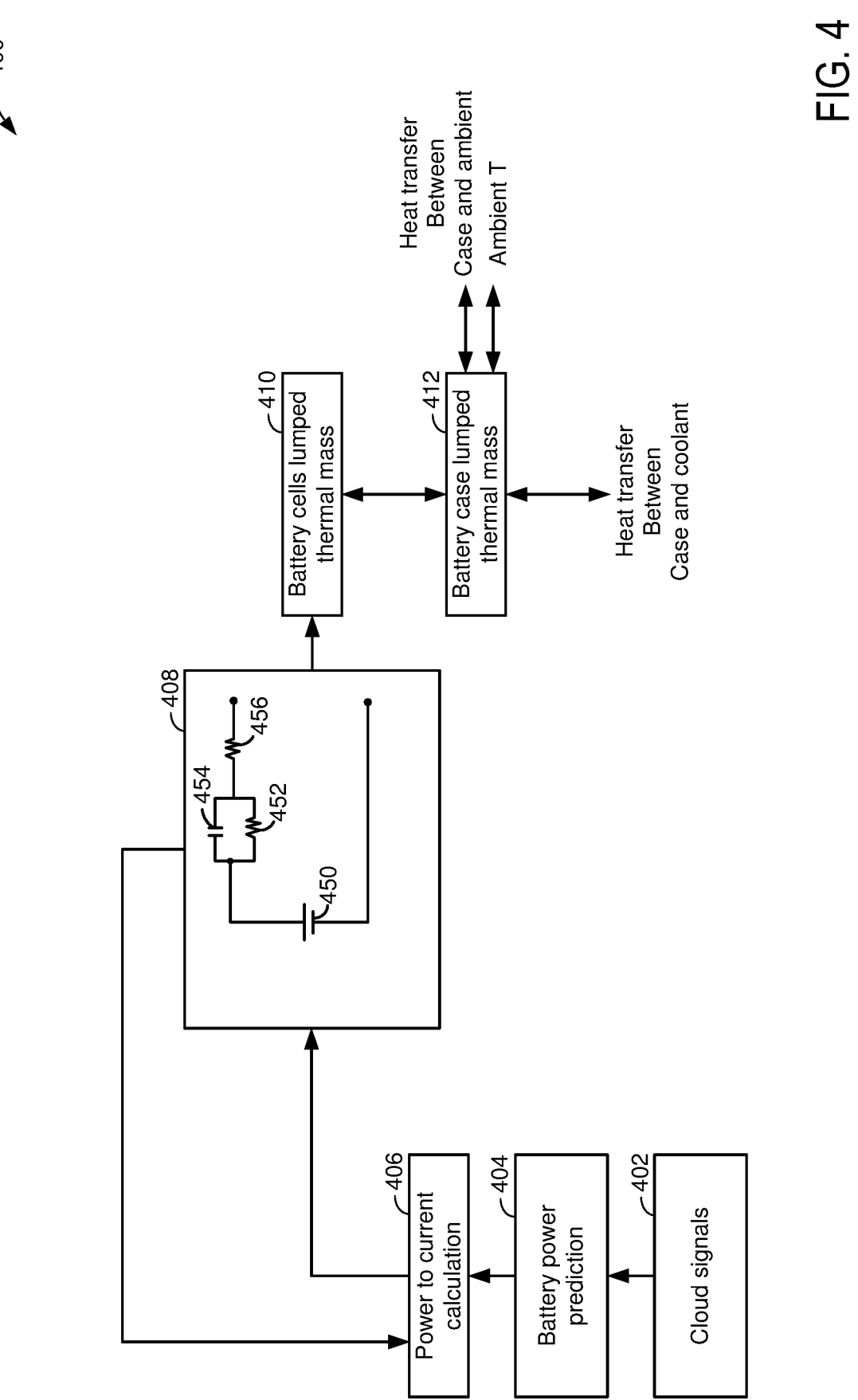
FIG. 4 is a block diagram for predicting a temperature of an electric energy storage device.
Figure 5:
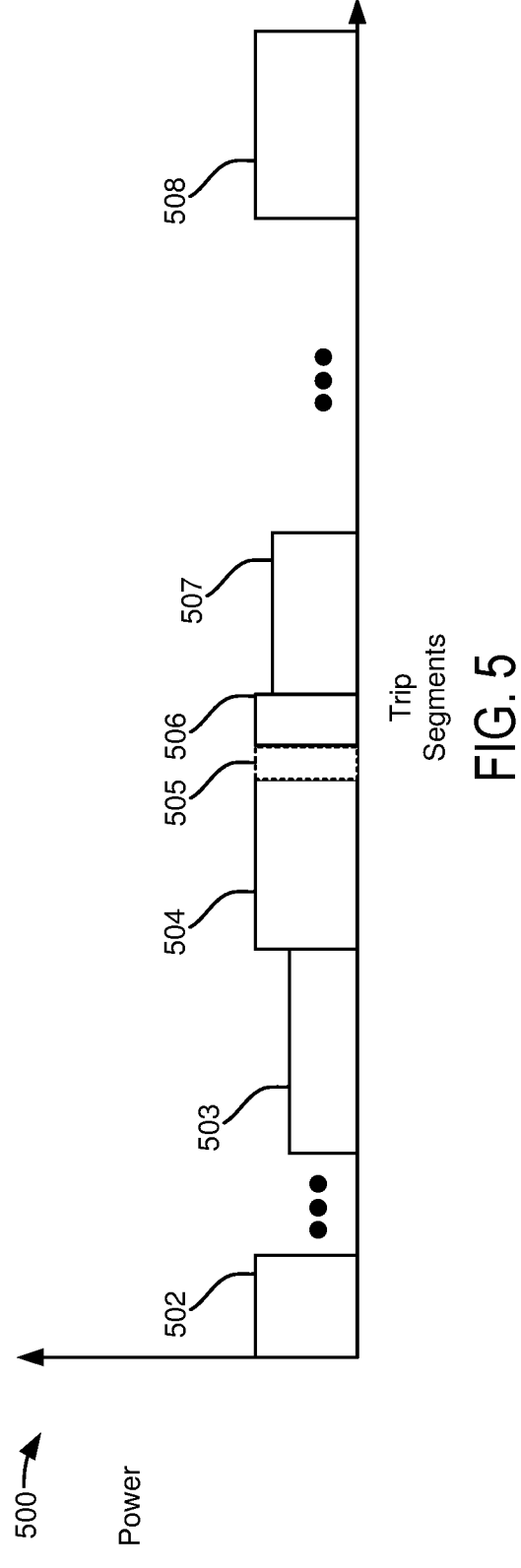
FIG. 5 shows a graphical representation of energy to complete a trip.
Figure 6:
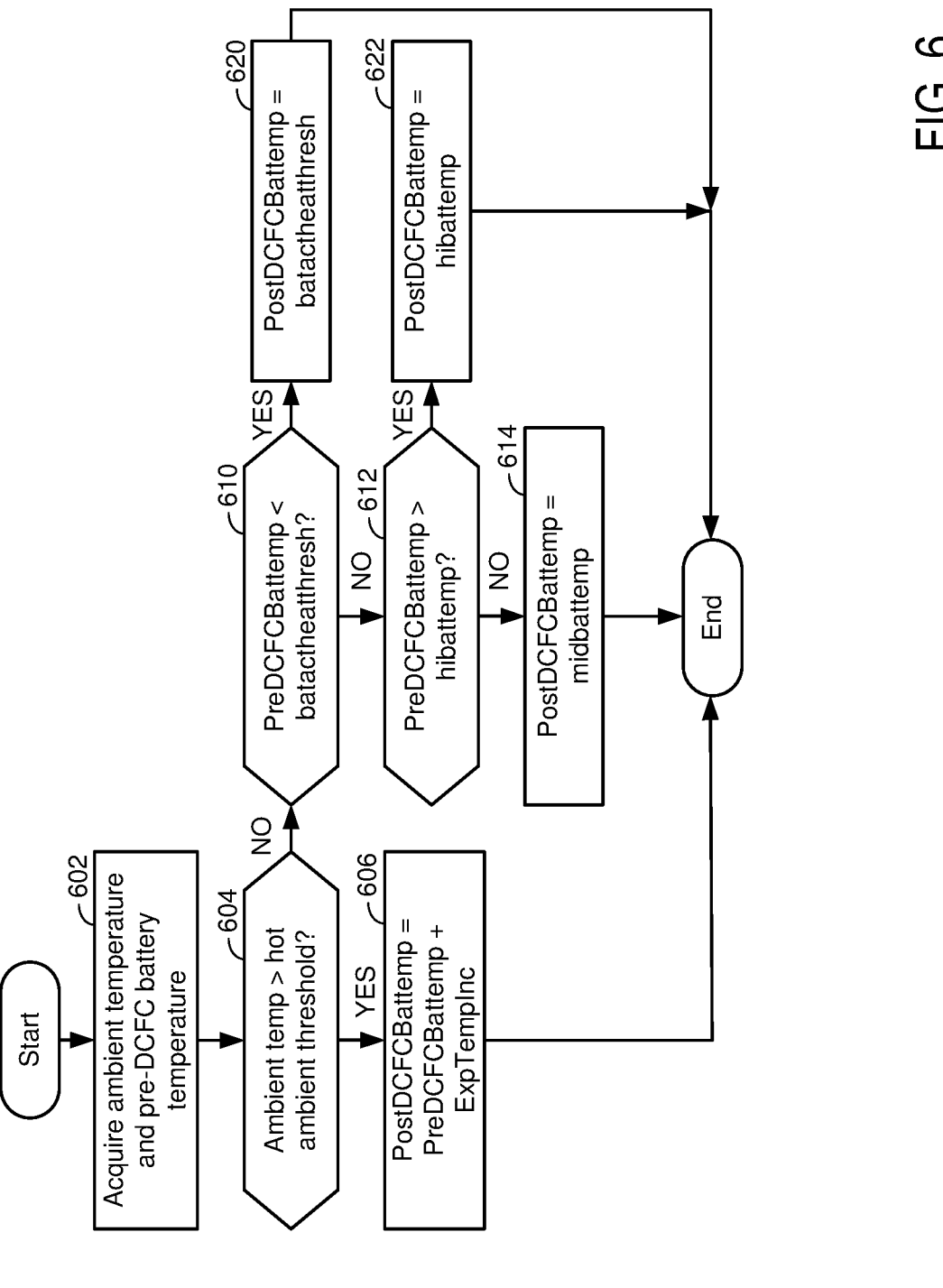
FIG. 6 shows a flowchart of a method for predicting a temperature of an electric energy storage device.

The present description is related to cooling an electric energy storage device (e.g., a battery, capacitor, etc.). In particular, the present method and system may operate a cooling system that has a cooling capacity that is less than a heating capacity of an electric energy storage device in a way that may reduce derating of the electric energy storage device. The electric energy storage device may be included in a vehicle as shown in FIG. 1. A temperature of the electric energy storage device may be managed via a cloud based system as shown in FIG. 2. The "cloud" as mentioned herein may be a remote server including memory, processing core, inputs/outputs, etc. that may be coupled to or communicate via the internet, satellite, radio frequency, or combinations thereof. A flowchart of a method for estimating a possibility of an electric energy storage device exceeding a threshold temperature is shown in FIG. 3. A block diagram for predicting a temperature of the electric energy storage device is shown in FIG. 4. Graphic representations of energy to complete a trip and electric energy device charge are shown in FIGS. 5 and 6. Finally, FIG. 7 shows a flowchart of a method for predicting a temperature of an electric energy storage device.

FIG. 1 is a schematic diagram of a vehicle 121 including a powertrain or vehicle propulsion system 100. A front portion of vehicle 121 is indicated at 110 and a rear portion of vehicle 121 is indicated at 111. Vehicle propulsion system 100 includes electric machine 126. Electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 has a rear axle 122. In some examples, rear axle 122 may comprise two half shafts, for example first half shaft 122a, and second half shaft 122b. Vehicle propulsion system 100 further has front wheels 130 and rear wheels 131. Rear wheels 131 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a gearbox 171 including a low gear 175 and a high gear 177 that are coupled to electric machine 126 via output shaft 126a of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122*a* and to second half shaft 122*b*. In some examples, an electrically controlled differential clutch (not shown) may be included in rear drive unit 136.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter system controller (ISC) 134 may convert alternating current generated by electric machine 126 to direct current for storage at the electric energy storage device 132 and vice versa. Electric drive system 135 includes electric machine 126 and inverter system controller 134. Inverter system controller may include a microcontroller, memory (e.g., random-access memory and read-only memory), and input/output circuitry (not shown). Electric energy storage device 132 may be a battery (e.g., a traction battery that provides energy to propel a vehicle), capacitor, inductor, or other electric energy storage device. Electric power flowing into electric drive system 135 may be monitored via current sensor 145 and voltage sensor 146. Position and speed of electric machine 126 may be monitored via position sensor 147. Torque generated by electric machine 126 may be monitored via torque sensor 148.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with electric machine 126, energy storage device 132, inverter system controller 134, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from driver demand pedal position sensor 194 which communicates with driver demand pedal 192. Pedal 192 may refer schematically to a driver demand pedal. Similarly, control system 114 may receive an indication of an operator requested vehicle braking via a human operator 102, or an autonomous controller. For example, control system 114 may receive sensory feedback from brake pedal position sensor 157 which communicates with brake pedal 156.

Energy storage device 132 may periodically receive electrical energy from a power source such as fast charging station 1 of a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the fast charging station 1 and the power grid (not shown). The fast charging station may be electrically coupled to a vehicle receptacle 3 via a plug 2. The receptacle 3 may be electrically coupled to the electric energy storage device 132.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be a single controller of the vehicle. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read only memory) 165, random access memory 166, digital inputs/outputs 168, and a microcontroller 167. Controller 112 may receive input data and provide data to human/machine interface 140 via CAN 199. Controller 112 may be a controller that is additional to inverter system controller 134, or alternatively, it may be a controller that is part of inverter system controller 134. Controller 112 may receive vehicle navigation and travel route data (e.g., travel distance, start of travel location, end of travel location, direct current fast charge (DCFC) station locations, road grades, geographical data, etc.) from navigation system 150.

Referring now to FIG. 2, a block diagram 200 including a cloud based cooling approach 250 is shown. Cloud based cooling approach 250 includes five functions that are shown as blocks 206-214. The cloud based cooling approach 250 may be implemented via instructions that are stored in cloud 204 or in a vehicle controller (e.g., 112 of FIG. 1). Cloud based cooling approach 250 may provide an opportunity assessment level for battery thermal management and a confidence level that is associated with the opportunity assessment to a battery thermal management system 216. Executable instructions may perform the functions and operations of the blocks in FIG. 2 and the steps in FIG. 3 and FIG. 6. The executable instructions may employ a routine that breaks a travel route into segments and delivers values for battery temperature, opportunity level, and a confidence assessment for each segment of the vehicle travel route to a battery thermal management system. The values may be provided for travel route segments before and after a scheduled or requested DCFC event, and the values may be based on battery temperature predictions for before and after the DCFC.

Cloud 204 may be comprised of a server including memory (e.g., read-only and random-access) 250, processing core 252, inputs/outputs 254, etc. that may be accessed via the internet, satellite, radio frequency, or combinations thereof. Cloud 204 may provide data, control functions, control parameters, learned behaviors, geographic data, weather data, and other data to cloud based cooling approach 250.

Measurements 202 may be provided to cloud based cooling approach 250 via vehicle sensors. Measurements may include, but are not limited to ambient air temperature, vehicle speed, battery temperature, battery current, battery voltage, vehicle position, and driver demand torque/power.

Battery thermal management system 216 may include one or more heat exchangers 217, adjustable valves 219, coolant, actuators (e.g., fan 220 and pump 222), temperature sensors, and a temperature controller 218 to adjust a temperature of a traction battery. Temperature controller 218 may include a processor, memory, and inputs/outputs for controlling a temperature of electric energy storage device 132. Battery thermal management system 216 may extract heat from battery cells 233 and case 234 of electric energy storage device 132. Cooling of the battery may be increased via increasing pump speed, increasing fan speed, and opening a cooling valve.

Cloud based cooling approach includes an opportunity assessment block 212 (e.g., a feature). The opportunity assessment block 212 generates an opportunity assessment level (e.g., a numeric value) by comparing battery cell temperature predictions along a predicted travel route to one or more calibratable threshold values. The opportunity assessment level may be an indication as to whether or not there may be a possibility of a battery temperature exceeding a threshold temperature. A higher opportunity level may be indicative of a greater possibility of the battery temperature exceeding the threshold temperature and opportunity to lower the possibility. A lower opportunity level may be indicative of a lower possibility of the battery temperature exceeding the threshold temperature. Varying levels of assumption on heat transfer (from battery to coolant) provide insight into urgency. In one example, the opportunity assessment level may be determined via the method of FIG. 3.

Referring now to FIG. 3, a flowchart of a method for predicting an opportunity assessment level is shown. The method of FIG. 3 may be at least partially implemented as executable instructions stored in controller memory in one or more of the systems of FIGS. 1 and 2. Further, the method of FIG. 3 may include actions taken in the physical world to transform operating states of one or more of the system of FIGS. 1 and 2.

At 302, method 300 acquires the vehicle travel route information. The vehicle travel route information may include, but is not limited to starting location, ending location, road elevation, road grade, vehicle speed limit, traffic signal/sign locations, and road surface type. The vehicle travel route information may be acquired at a beginning of a travel route before the vehicle begins to travel via input to a navigation system or via a record of prior trip history that may be stored in controller memory. Method 300 proceeds to 304 after the vehicle travel route information is acquired.

At 304, method 300 predicts electric energy storage device temperature without heat transfer. In one example, method 300 may predict electric energy storage device temperature via one or more models. For example, electric energy storage device temperature may be predicted as described for the block diagram of FIG. 4 where there is no heat transfer between cells of the battery and a battery case, and where there is no heat transfer between the battery case and coolant. Method 300 proceeds to 306 after predicting the electric energy storage device temperature along the vehicle travel route.

At 306, method 300 judges whether or not the predicted electric energy storage device temperature is greater than a threshold temperature. In one example, the threshold temperature is an upper temperature that is not to be exceeded for longer than a predetermined amount of time. Thus, method 300 compares a predicted electric energy storage device temperature that does not include heat transfer to or from the electric energy storage device to a threshold temperature. If method 300 judges that the predicted electric energy storage device temperature is greater than the threshold temperature, the answer is yes and method 300 proceeds to 308. Otherwise, the answer is no and method 300 proceeds to 350.

At 350, method 300 indicates that there is a low possibility of electric energy device temperature exceeding the threshold temperature, such that the level of opportunity (e.g., zero) to control cooling of the electric energy device so that the electric energy device temperature does not exceed the threshold temperature is low. Method 300 does not take control action (e.g., adjusting a cooling valve position or a fan speed) since the opportunity level is low. Method 300 proceeds to 318.

At 318, method 300 sends the opportunity assessment level and a confidence level to the battery thermal management (BTM) system or cooling system (e.g., 216 of FIG. 2). The opportunity assessment level may be an integer value of zero, one, or two as discussed at 350, 355, and 316. The confidence level assessment may take on a value of low, medium, or high. In one example, the confidence level assessment is a function of time or distance to identified opportunity to cool the battery, severity of opportunity (e.g., magnitude of cooling system adjustment to compensate for the battery temperature exceeding the threshold temperature), accuracy metrics from modeling, and statistical metrics for cloud signals. The battery thermal management system adjusts cooling for the battery according to the opportunity assessment level and the confidence level. For example, if the opportunity level is two and the confidence level is high, the battery thermal management system may increase an opening amount of a cooling valve and increase a speed of a cooling fan. If the opportunity level is zero and the confidence level is high, the battery thermal management system may maintain an opening amount of a cooling valve and maintain a speed of a cooling fan. Method 300 proceeds to exit.

If an opportunity to maintain battery temperature in a desired range is detected, the battery management system may pre-cool the battery by reducing the temperature thresholds at which cooling modes are activated (e.g. battery coolant chiller pump (e.g., 222) turns on when the battery temperature reaches 35° Celsius rather than the typical 40° Celsius), initiating active cooling at some level, or increasing cooling capacity designated for the battery (rather than the cabin climate control). This pre-cooling may occur during a drive while approaching a DCFC waypoint or during a DCFC event (e.g., predictions of times and geographical locations where the vehicle's battery is expected to be DC fast charged).

In addition to pre-cooling the battery ahead of a DCFC event to avoid higher post-DCFC temperatures, there may be DCFC-specific strategies that may be used for proactive thermal management. For example, the DCFC power (or current) (e.g., battery current or power during DCFC) may be limited to keep the battery temperature below a threshold or near a target value. This post-DCFC expected temperature may be determined based on post-DCFC state of charge (SOC) and ambient temperature and implemented as a lookup table. The fraction of full DCFC power (or current) permitted may vary based on the distance between the temperature threshold or expected temperature. In addition to base cloud based thermal management information, this approach may apply some knowledge of the magnitude of the thermal threat being avoided (e.g. 5° Celsius above threshold). Another DCFC-specific proactive thermal management option may be to delay the start of DCFC after the arrival at a DCFC waypoint (e.g. for 5 minutes) in order to cool or warm the battery before the start of charging. Similarly, the end of the DCFC could be extended slightly (e.g. for 5 minutes) in order to cool or warm the battery before the vehicle is driven away.

When on route to a DCFC waypoint, it may also be possible for proactive thermal management to be used to improve charging performance or reduce aging impact of DCFC rather than avoid thermal threats. This may involve modifying the cooling and/or heating thresholds so that the battery temperature is higher or lower than it otherwise would be when arriving at the DCFC waypoint. For vehicles where heating is shared between the cabin and the battery, off-plug heating may be limited to using motor electronics rather than full battery heating capability. Proactive thermal conditioning for DCFC improvement may be limited to when the vehicle is known to be on-route to a DCFC station (e.g. next destination is a battery charger with maximum charging power above 40 kW), the time (or distance) to the battery charger is below a calibratable threshold (e.g. 15 min), and there is sufficient vehicle range remaining such that the vehicle may arrive at the charger with a calibratable buffer of range remaining (e.g. 3 km, so that driver isn't stranded before arriving at DCFC due to preconditioning). In addition to base cloud based thermal management information, this approach may apply some knowledge of time and distance to upcoming DCFC waypoints, remaining vehicle range, the pre-DCFC battery temperature without preconditioning, and a desired temperature range for DCFC.

At 308, method 300 predicts electric energy storage device temperature with a large amount of heat transfer. In one example, method 300 may predict electric energy storage device temperature via one or more models. For example, electric energy storage device temperature may be predicted as described for the block diagram of FIG. 4 where there is a large amount of heat transfer between cells of the battery and a battery case, and where there is a large amount of heat transfer between the battery case and coolant. Method 300 proceeds to 310 after predicting the electric energy storage device temperature along the vehicle travel route.

At 310, method 300 judges whether or not the predicted electric energy storage device temperature is greater than a threshold temperature. In one example, the threshold temperature is an upper temperature that is not to be exceeded for longer than a predetermined amount of time. Thus, method 300 compares a predicted electric energy storage device temperature that includes a large amount of heat transfer to or from the electric energy storage device to a threshold temperature. If method 300 judges that the predicted electric energy storage device temperature is greater than the threshold temperature, the answer is yes and method 300 proceeds to 355. Otherwise, the answer is no and method 300 proceeds to 312.

At 355, method 300 indicates that there is a high possibility of electric energy device temperature exceeding the threshold temperature, such that the level of opportunity (e.g., two) to control cooling of the electric energy device so that the electric energy device temperature exceeds the threshold temperature is high. Method 300 requests taking control actions (e.g., adjusting a cooling valve position or a fan speed) before the battery temperature exceeds the threshold temperature since the opportunity level is high and taking preemptive control actions may allow the battery thermal management system to maintain battery temperature below the threshold temperature even though the battery thermal management system may dissipate less thermal energy that the battery may generate in a short period of time. Method 300 proceeds to 318.

At 312, method 300 predicts electric energy storage device temperature with a middle or medium amount of heat transfer. In one example, method 300 may predict electric energy storage device temperature via one or more models. For example, electric energy storage device temperature may be predicted as described for the block diagram of FIG. 4 where there is a medium amount of heat transfer between cells of the battery and a battery case, and where there is a medium amount of heat transfer between the battery case and coolant. Method 300 proceeds to 314 after predicting the electric energy storage device temperature along the vehicle travel route.

At 314, method 300 judges whether or not the predicted electric energy storage device temperature is greater than a threshold temperature. In one example, the threshold temperature is an upper temperature that is not to be exceeded for longer than a predetermined amount of time. Thus, method 300 compares a predicted electric energy storage device temperature that includes a medium amount of heat transfer to or from the electric energy storage device to a threshold temperature. If method 300 judges that the predicted electric energy storage device temperature is greater than the threshold temperature, the answer is yes and method 300 proceeds to 360. Otherwise, the answer is no and method 300 proceeds to 316.

At 360, method 300 indicates that there is a medium possibility of electric energy device temperature exceeding the threshold temperature, such that the level of opportunity (e.g., one) to control cooling of the electric energy device so that the electric energy device temperature exceeds the threshold temperature is medium. Method 300 requests taking control actions (e.g., adjusting a cooling valve position or a fan speed) before the battery temperature exceeds the threshold temperature since the opportunity level is medium and taking preemptive control actions may allow the battery thermal management system to maintain battery temperature below the threshold temperature. Method 300 proceeds to 318.

At 316, method 300 indicates that there is a low possibility of electric energy device temperature exceeding the threshold temperature, such that the level of opportunity (e.g., zero) to control cooling of the electric energy device so that the electric energy device temperature exceeds the threshold temperature is low. Method 300 does not request taking control actions (e.g., adjusting a cooling valve position or a fan speed) before the battery temperature exceeds the threshold temperature since the opportunity level is low and taking preemptive control actions may not yield useful results. Method 300 proceeds to 318.

In this way, method 300 may make an opportunity assessment that is based on whether or not heat transfer from the battery to the battery cooling system would allow a battery temperature to remain below a threshold temperature. The opportunity assessment and a confidence level for the opportunity assessment may be a basis for making or not making adjustments to a battery cooling system for the purpose of maintaining battery temperature.

Returning now to FIG. 2, block diagram 200 includes a temperature prediction block 206. In one example, the temperature prediction block 206 may include one or more models as shown in FIG. 4 to predict battery temperature. The model or models may receive inputs from the cloud (e.g., servers that are connected to the internet or other network that may communicate with one or more vehicle controllers) based predictions of vehicle behavior and environmental conditions over the vehicle's expected travel route. The model or models may calculate battery temperature predictions over the vehicle's travel route and the predictions may be for battery temperatures before and after a DCFC event.

FIG. 4 illustrates a block diagram for predicting battery temperature over a vehicle's travel route. Block diagram 400 includes a cloud block 402 which symbolizes a cloud based server generating estimates of battery state including battery temperature and battery state of charge, vehicle speed, road grade, DCFC events for the battery, and ambient temperature according to the vehicle travel route and weather data. Signals from the cloud are delivered to the battery power prediction block 404. The battery power prediction block 404 generates a power amount that is to be input or output to the battery as the vehicle travels along the vehicle travel route. In one example, battery power prediction block 404 estimates an amount of power that the battery will supply to an electric machine to propel the vehicle along the vehicle travel route. The estimate may be based on, but not limited to vehicle mass, road load, air density, and frontal area of the vehicle. For steady-state conditions, the model may be of the form: $F=A+Bv+Cv^2$, where F is the road load force to keep the vehicle at the steady state speed, v is vehicle velocity, and A-C are coefficients. Driveline losses (e.g., mechanical losses, inverter losses, electric machine losses) may be added to the road load force to determine power that the battery is predicted to source to propel the vehicle along the vehicle travel route. The predicted battery power may be supplied to block 406, which generates an electric current output from the battery. In one example, the electric current output from the battery may be a function of battery voltage, internal battery resistance, battery open circuit voltage, and the power that the battery is predicted to source to propel the vehicle along the vehicle travel route. The open circuit voltage of the battery may be fed back to block 406 via block 408.

At block 408, an equivalent circuit model (ECM) is a basis for predicting an amount of heat that is generated via battery cells receiving or sourcing charge. In one example, the RC model outputs battery heat as a function of battery internal resistance, battery internal capacitance, and electric current flow into or out of the battery. The heat that is predicted to be generated by the battery is input to block 410. The RC circuit model may include representations of an open circuit voltage 450, a resistor 452, a capacitor 454, and a second resistor 456.

At block 410, an amount of heat that is transferred from the battery cells to the battery case may be predicted via a lumped parameter model. For example, the heat transferred from the battery cells to the battery case may be simplified to a first order model. The model outputs an amount of heat that is transferred from battery cells to the battery case. The output of the model is input to block 412.

At block 412, an amount of heat that is transferred from the battery case to battery coolant and ambient air may be predicted via a lumped parameter model. The model outputs an amount of heat that is transferred from battery case to the battery coolant and ambient air.

Battery temperature predictions for the opportunity assessment may be determined with heat transfer rates between the battery case and the battery coolant at different constant levels (e.g., no heat transfer, middle level heat transfer, and high level heat transfer). The middle level heat transfer rate and the high level heat transfer rates may be adjustable.

As previously mentioned, the cloud signals may include predictions of vehicle DCFC events. The cloud based thermal management generates DCFC events. In particular, the cloud based thermal management generates DCFC events for locations and times along a planned vehicle travel route as an instantaneous change in the predicted states at an identified DCFC waypoint (e.g., time and geographic location where DCFC is predicted to occur). The base vehicle travel route-informed time-based solver continues generating battery temperature predictions up to the DCFC event, re-initializes model states to values representing the post-DCFC battery conditions at the location of the DCFC event, and resume generating battery temperature predictions after the DCFC event. This process may be repeated for each DCFC event in the current vehicle travel route.

To generate a DCFC waypoint, it may be desired to have additional information that is beyond base route data. This information may include planned stop location and type (e.g. charging or destination) with information on chargers (such as maximum power) if applicable or explicitly identified DCFC waypoints. In either scenario, maximum charger power values may be utilized.

In one example, it may be desirable to know or estimate three states: battery state of charge (SOC), battery temperature, and resistive/capacitive (RC) voltage. In one example, battery case temperature may be set equal to the battery temperature, or it may be set equal to the battery temperature minus some factor (e.g. calibrated constant or calibrated dependence on ambient and battery temperature captured in lookup table).

After a DCFC event, SOC, battery temperature (Tbatt), and RC voltage (Vrc) may be re-initialized and set equal to values representing post-DCFC operating conditions. These post-DCFC operating conditions may be predicted using information including predicted states (SOC, battery temperature) at arrival to charging site, maximum DC fast charge Electric Vehicle Supply Equipment (EVSE) power, and ambient temperature.

Upcoming DCFC waypoints may be identified using a designated signal or using a combination of signals. One possible combination of signals could be considering upcoming waypoints (1st signal) that are designated as battery charging stops (2nd signal) where the maximum charger power (3rd signal) is greater than a calibratable threshold.

DCFC waypoints may be described by a time or a distance relative to a travel route start time and/or location or relative to a present time and/or location. DCFC waypoints may be converted so that they are in time (rather than distance) and relative to the present prediction cycle and full vehicle travel route. Interpolation may be utilized to localize a prediction horizon relative to the full vehicle travel route prediction. DCFC waypoints that are outside of the present prediction cycle (e.g. already occurred or occur after end of present prediction cycle based on time or distance) may be ignored until they are included in the present prediction horizon.

Battery state of charge (SOC) is one input to the battery temperature prediction model. The post-DCFC SOC (e.g., SOC immediately following a DCFC) may be based on the SOC at which the driver is expected to complete the charging event. For example, the SOC at which the driver is expected to complete the charging event may be set equal to a calibratable post-DCFC default SOC value (e.g., 80%). This may be desirable if vehicle controls motivate vehicle operators to DCFC to a consistent SOC (e.g. 80%) or if information is limited. A more reliable or accurate post-DCFC state may be generated with more information regarding customer usage. For example, if the navigation system provides a destination required SOC or the SOC required at the end of the DCFC to complete the vehicle travel route, this value may be used as the post-DCFC SOC. Similarly, the vehicle operator may be able to set the target SOC for a DCFC event, which may be applied as the post-DCFC SOC. If historic DCFC data is stored, last final DCFC SOC, last user-defined DCFC target SOC, or some statistically determined historic final DCFC SOC could be applied for the post-DCFC SOC. If post-DCFC route information is known without specific information on the post-DCFC SOC, the post-DCFC SOC may be predicted. The vehicle operator may be expected to DCFC to at least a SOC that enables them to travel to their next charging waypoint/ destination, plus some added range for additional travel or uncertainties as shown in the following equation:

$$SOCPostDCFC = SOCRequired + SOCCushion$$

where SOCpostDCFC is the desired SOC after the planned DCFC, SOCRequired is the SOC required to complete the vehicle travel route after the planned DCFC, and SOCCushion is additional reserved SOC intended to account for uncertainties or post-planned vehicle usage. The SOCCushion value may be calibratable or it may change based on destination. SOCRequired can be calculated as the ratio of the energy required to complete the planned trip (eRequired) to the total usable energy that the battery can store (eUsable):

$$SOCRequired = \frac{eRequired}{eUsable}$$

Note that if the total energy capacity of the battery is different than the customer usable energy capacity of the battery, this equation may need to be slightly adjusted.

The energy required to complete a planned trip (e Required) can be calculated by summing the energy for route segments after the DCFC event and before reaching the next DCFC event or destination. In one example, the following equation may be applied to determine the energy after DCFC to reach a final destination of a vehicle travel route:

$$eRequired = \frac{P(i) \cdot t(i) \cdot f + P(i+1{:}n) \cdot t(i+1{:}n)}{3600}$$

where P is the segment battery power prediction in Watts, t is segment travel time in seconds, i is the segment in which DCFC happens, n is the total number of segments in the route, and f is the fraction of segment i remaining after the DCFC event. While this equation indexes using time, a similar distance-based equation may also be applied.

Referring now to FIG. 5, a plot 500 illustrates electric power used by a vehicle to travel a route that has been broken down into a plurality of trip segments is shown. The vertical axis represents electric power and the amount of electric power increases in the direction of the vertical axis. The horizontal axis represents trip segments and the trip segments on the left side of the plot represent trip segments that are earlier in the trip. Trip segments on the right side of the plot are trip segments that occur later in the trip. A trip segment may correspond to a length of time traveled or a distance traveled. The total trip from start of a travel route to end of the travel route is broken into a plurality of segments 502-508. The dots between segments indicate additional segments may be present but are not shown. Segments shown by solid lines (e.g., segment 502) represent trip segments where the vehicle is consuming electric power to travel. Trip segments that are shown by dashed lines (e.g., segment 505) represent trip segments where the vehicle is charged via DCFC. The amount of electric energy to complete a trip after DCFC may be determined by summing energy (Power*segment time) for each segment after DCFC up to the time when the destination is reached.

Returning now to the description of how battery temperature may be predicted, a vehicle operator may choose to charge more or less than expected. In one example, the post-DCFC battery temperature may be predicted using a combination of ambient temperature, post-DCFC SOC, post-DCFC delta SOC, and maximum electric vehicle supply equipment (EVSE) power. The post-DCFC battery temperature (Tbatt,postDCFC) may be predicted as the sum of the pre-DCFC time-stepping predicted battery temperature (Tbatt,preDCFC) and the post-DCFC temperature delta (ΔTbatt,postDCFC), clipped (limited) to a maximum temperature (Tbatt,postDCFCmax) as described in the following equation:

$$Tbatt, postDCFC =$$
$$min(Tbatt, preDCFC + \Delta Tbatt, postDCFC, Tbatt, postDCFCmax)$$

where min is a function that returns a minimum value and where the variables are as previously described. Due to battery thermal management logic, active battery cooling may be expected to maintain the battery temperature below a certain threshold. At lower ambient temperatures, the battery may stabilize at a lower temperature due to more heat loss to ambient air. Therefore, the post-DCFC battery temperature may be expected to be less than a maximum value (Tbatt,postDCFCmax) that is a function of the ambient temperature (Tamb). The maximum value may be determined via a lookup table via the following equation:

$$Tbatt,postDCFCmax=f(Tamb)$$

where f is a function or lookup table that returns the maximum value Tbatt, postDCFCmax via a lookup table.

The post-DCFC temperature delta (ΔTbatt,postDCFC) may be determined based on the ambient temperature (Tamb) and the post-DCFC delta SOC (ΔSOCpostDCFC) if constant post-DCFC SOC and maximum EVSE power are assumed via the following equation:

$$\Delta Tbatt,postDCFC=g(\Delta SOCpostDCFC,Tamb)$$

where g is a function or lookup table that returns the post-DCFC temperature change or delta. The function g may be implemented using a lookup table where the post-DCFC delta temperature is selected based on a temperature range (e.g. <30° C., 30-40° ° C., >40° C.) and the post-DCFC delta SOC (e.g. in intervals of 10% or 0.1). The function or table may be calibrated (e.g., supplied with values) based on battery electric vehicle DCFC events at various ambient temperatures. The function or lookup table structure may vary based on battery chemistry, the charging strategy, and thermal controls. Note that battery or displayed SOC may be used with alternate calibrations.

A review of battery electric vehicle DCFC data where a battery was reasonably warm (e.g. <30° C.), some data showed a decrease in battery temperature during a DCFC event. This may be more likely to happen once high SOCs are reached (e.g. about 80% of displayed or customer state of charge (CSOC)). Therefore, in some examples, this dependence may be a basis for adjusting a post DCFC temperature change via the following equation:

$$\Delta Tbatt,postDCFC = f(\Delta SOC, SOCpostDCFC, Tamb)$$

where f is a function that returns the post DCFC temperature change, $\Delta SOC$ is the change in SOC, Tamb is ambient temperature, and SOCpostDCFC is SOC immediately following DCFC. Further variations on this implementation may additionally account for maximum DCFC EVSE power PMax EVSE, as shown in the following equation:

$$\Delta Tbatt,postDCFC = f(\Delta SOC, SOCpostDCFC, Tamb, PMax\ EVSE)$$

Such a structure may compensate for all major factors affecting battery temperature rise, including charging time (via $\Delta SOC$), maximum charging current (via PMax EVSE), expected heat transfer (via Tamb), and final charging current (via SOCpostDCFC). This structure may help capture variables influencing the temperature change during DCFC, though it may require a more complex representation (e.g. equation or 4D lookup table). Some possible functional dependencies are as follows:

$$\Delta Tcell, pred, nom = h(\Delta SOC, Tamb) \cdot \frac{|SOCpred - SOCtmax|}{SOCnorm}$$

$$\Delta Tcell, pred, nom = h(\Delta SOC, Tamb) - TsubMax \cdot \frac{|SOCpred - SOCtmax|}{SOCnorm}$$

$$\Delta Tcell, pred(FC) = \Delta Tcell, pred, nom \cdot \frac{PDCFC}{PDCFC, norm}$$

$$\Delta Tcell, pred(PDCFC) = \Delta Tcell, pred, nom \cdot \frac{PDCFC - PDCFC, min}{PDCFC, norm}$$

$$\Delta Tcell,$$

$$pred(PDCFC) = \begin{cases} \Delta Tcell, pred, highP & \text{if } PDCFC > PDCFC, Thresh \\ \Delta Tcell, pred, lowP & \text{if } PDCFC \le PDCFC, Thresh \end{cases}$$

The post-DCFC delta SOC ($\Delta SOCpostDCFC$) is the difference between the post-DCFC SOC (SOCpostDCFC) and the pre-DCFC SOC (SOCpreDCFC) as illustrated in the following equation:

$$SOCPostDCFC = SOCpostDCFC - SOCpreDCFC$$

Note that if battery SOC is different than the SOC that is displayed to the vehicle operator, some conversions may be applied. In an alternate example, the post-DCFC battery temperature (Tbatt,postDCFC) may be predicted based on ambient temperature and the pre-DCFC battery temperature via selection logic as shown in FIG. 6 or a look-up table.

Referring now to FIG. 6, a flowchart of a method for predicting post-DCFC battery temperature is shown. The method of FIG. 6 may be at least partially implemented as executable instructions stored in controller memory in one or more of the systems of FIGS. 1 and 2. Further, the method of FIG. 6 may account for actions taken in the physical world to transform operating states of one or more systems of FIGS. 1 and 2.

At 602, method 600 acquires ambient temperature and the pre-DCFC battery temperature. The ambient temperature may be acquired via cellular network data, a sensor, or the cloud. The pre-DCFC temperature may be determined via a prediction via the cloud from segment battery power predictions that are input to the battery temperature prediction model. Method 600 proceeds to 604.

At 604, method 600 judges whether or not ambient air temperature is greater than a first ambient temperature threshold (e.g., greater than 29° Celsius). If so, the answer is yes and method 600 proceeds to 606. Otherwise, the answer is no and method 600 proceeds to 610.

At 606, method 600 sets the post-DCFC battery temperature (PostDCFCBattemp) equal to the pre-DCFC battery temperature (PreDCFCBattemp) plus a predetermined expected battery temperature increase (ExpTempInc). The predetermined expected battery temperature increase may be a function of the battery pack charge capacity, vehicle configuration, rate of battery charging, and other parameters. Method 600 proceeds to exit.

At 610, method 600 judges whether or not the pre-DCFC battery temperature (PreDCFCBattemp) is less than a battery active heating threshold (batactheatthresh). The battery active heating threshold is a battery temperature below which battery cell protection constraints or limits substantially limit the permitted battery charging rate. As such, it may be desirable to expend battery energy to actively heat the battery so that the battery temperature reaches and is maintained above the battery active heating threshold so that higher charging rates may be permitted and/or the battery self-heats to a state where higher charging rates are permitted. If method 600 judges that the pre-DCFC battery temperature is less than the battery active heating threshold temperature, the answer is yes and method 600 proceeds to 620. Otherwise, the answer is no and method 600 proceeds to 612.

At 620, method 600 sets the post-DCFC battery temperature (PostDCFCBattemp) equal to the battery active heating threshold temperature (batactheatthresh). Method 600 adjusts the post-DCFC battery temperature (PostDCFCBattemp) to the battery active heating threshold temperature (batactheatthresh) because if the battery starts operation below the active heating threshold, it may be actively heated to the active heating threshold temperature so that the battery charges at a desirable rate. Method 600 proceeds to exit.

At 612, method 600 judges whether or not the pre-DCFC battery temperature (PreDCFCBattemp) is greater than a high battery temperature threshold (hibattemp). The high battery temperature threshold (hibattemp) is the temperature above which the battery temperature is expected to increase during a DCFC to the maximum temperature that is permitted by the battery cooling control system. The battery cooling system may maintain the battery temperature at or slightly below the high battery temperature threshold. If the battery starts operating below the high battery threshold temperature threshold but above the battery active heating threshold, the battery temperature may increase to or be maintained at a middle battery temperature. If method 600 judges that the pre-DCFC battery temperature is greater than the high battery temperature threshold, the answer is yes and method 600 proceeds to 622. Otherwise, the answer is no and method 600 proceeds to 614.

At 622, method 600 sets the post-DCFC battery temperature (PostDCFCBattemp) equal to the high battery temperature threshold (hibattemp). Method 600 adjusts the post-DCFC battery temperature to the high battery temperature. Method 600 proceeds to exit.

At 614, method 600 sets the post-DCFC battery temperature (PostDCFCBattemp) equal to a middle battery temperature. Method 600 adjusts the post-DCFC battery temperature to the middle battery temperature threshold temperature. Method 600 proceeds to exit.

In this way, post-DCFC battery temperature may be predicted according to pre-DCFC battery temperature, measured battery temperature, predicted vehicle usage, ambient temperature, a battery active heating threshold, hot ambient temperature threshold, and a high battery temperature threshold. By adjusting the post-DCFC battery temperature, the battery temperature may reflect heating that may be caused by charging of the battery via a fast DC charger.

Returning now to the description of predicting battery temperature, the third and final state to re-initialize the battery temperature prediction model is the RC voltage used in an equivalent circuit model of the battery. VRC depends on the recent battery usage, and can be estimated with the following equation:

$$VRC = VOCV - Vt - R0*1$$

where Vt is the terminal voltage, VOCV is the open circuit voltage of the battery, R0 is the series resistance of the battery, and/is the battery current. During an extended charging event, VRC may be expected to be negative such that Vt>VOCV. The battery parameter (R0) may vary during a charging event, but it may not be estimated during a charging event due to lack of excitation. If R0 is estimated based on pre- and post-DCFC estimates, the magnitude of VRC may be large during a DCFC event. However, the effects of the initial VRC fade quickly and they have limited effects. Therefore, VRC may be set to a constant (such as zero) as a reasonable way to limit calibration and complexity. Alternatively, VRC may be determined as the product of the DCFC resistance (RDCFC) and the expected final DCFC current (IDCFC). This represents a limit value for VRC and may be expressed via the following equation:

$$VRC = RDCFC * IDCFC, \text{final}(SOCpostDCFC)$$

RDCFC may be a calibrated (an adjustable) constant, calibrated and scaled for battery age, a rolling average of the learned parameter, or the most recent learned R0. The dependence of IDCFC, final on the post-DCFC SOC could be calibrated and captured in a look-up table. In an alternative example, IDCFC,final may be dependent on both post-DCFC SOC and the maximum EVSE power as expressed via the following equation:

$$VRC = RDCFC * IDCFC, \text{final}(SOCpostDCFC, PMax EVSE)$$

Other options for VRC include setting it equal to the VRC from before the DCFC event or defining it based on the predicted post-DCFC SOC (e.g. calibrated lookup table or function).

In this way, battery temperature may be predicted so that it may be applied to the control a battery thermal management system so that battery temperature may stay below a threshold temperature. The battery temperature may remain below the threshold temperature even when thermal output of the battery exceeds the capacity of the battery thermal management system to extract heat from the battery.

Referring back to FIG. 2, cloud based cooling approach 250 also includes a model monitoring block 208. The monitoring block compares predicted battery and cooling system states to observations as they become available. In one example, the comparison may include subtracting the predicted battery temperature value from the actual observed battery temperature to generate a battery temperature prediction error. The observed battery cell temperature can be compared to either a normalized modeled battery temperature (calculated using the three HV battery cell temperature predictions used for opportunity assessment) at regular intervals or to a real-time simulation of the same model using vehicle observations as the key inputs and boundary conditions. Prediction accuracy metrics may be calculated from these battery temperature comparisons to inform the confidence assessment and model adaptation functions. Multiple variables can be monitored in this way, including but not limited to battery case temperature, battery SOC and trip distance remaining. If the active prediction deviates sufficiently far from observations (actual observed battery temperatures), a new battery temperature prediction can be requested (e.g. cloud call for route update or re-initialize with current conditions).

Finally, FIG. 2 also includes a model adaptation block 210. The model adaptation function updates model parameters to account for 'change over time' (as the vehicle ages) and 'vehicle to vehicle' (part to part) hardware variations. Parameters are learned over time to reduce the error between model outputs and vehicle observations. Model parameters may be adapted as a function of driver aggressiveness and/or climate settings, as these influence battery power usage and therefore temperature, and can be learned for individual drivers or specific drives.

The system of FIGS. 1 and 2 provides for a system, comprising: a traction battery; a cooling system coupled to the traction battery; and a controller including executable instructions that cause the controller to predict a temperature of the traction battery and generate an opportunity assessment, where the opportunity assessment is based on the temperature of the traction battery being predicted to exceed a threshold temperature, where the temperature of the traction battery is predicted prior to a traction battery charging event, and where the temperature of the traction battery based on time and a segment of a travel route. In a second example that may include the first example, the system includes where the segment is based on a time interval. In a third example that may include one or both of the first and second examples, the system further comprises additional executable instructions to estimate a power to propel a vehicle based on the segment. In a fourth example that may include one or more of the first through third examples, the system includes where the power to propel the vehicle is based on summing a plurality of segments. In a fifth example that may include one or more of the first through fourth examples, the system further comprises additional executable instructions that cause the controller to predict the temperature of the traction battery after the traction battery has been charged via a fast charging station, but prior to the traction battery being charged by the fast charging station. In a sixth example that may include one or more of the first through fifth examples, the system further comprises a second controller including executable instructions that cause the controller to adjust operation of the cooling system in response to the temperature of the traction battery that has been predicted. In a seventh example that may include one or more of the first through sixth examples, the system includes where adjusting operation of the cooling system includes activating a pump.

The methods described herein provide for a method for thermal management of a traction battery, comprising: prior to a traction battery charging event, predicting a temperature of the traction battery before and after the battery charging event; generating a confidence level for the temperature of the traction battery that is predicted; and adjusting cooling of the traction battery in response to the temperature of the traction battery that is predicted and the confidence level. In a first example, the method further comprises breaking a vehicle travel route into a plurality of segments. In a second example that may include the first example, the method further comprises predicting the temperature for each segment of the plurality of segments. In a third example that may include one or both of the first and second examples, the method further comprises determining a battery power consumed during each segment of the plurality of segments. In a fourth example that may include one or more of the first through third examples, the method includes where the temperature of the traction battery is predicted from a resistive/capacitive model. In a fifth example that may include one or more of the first through fourth examples, the method includes where the confidence level is based on a time or distance to an identified opportunity to cool the traction battery before a threshold temperature is exceeded by the temperature of the traction battery. In a sixth example that may include one or more of the first through fifth examples, the method includes where adjusting cooling of the traction battery includes increasing output of a coolant pump. In a seventh example that may include one or more of the first through sixth examples, the method includes where adjusting cooling of the traction battery includes increasing a fan speed.

The methods described herein also provide for a method for thermal management of a traction battery, comprising: prior to a traction battery charging event, predicting a temperature of the traction battery before and after the battery charging event, where the temperature is based on an ambient air temperature; generating a confidence level for the temperature of the traction battery that is predicted; and adjusting cooling of the traction battery in response to the temperature of the traction battery that is predicted and the confidence level. In a first example, the method includes where the temperature is further based on a battery active heating threshold. In a second example that may include the first example, the method includes where the temperature is further based on a battery temperature before fast DC charging of the traction battery. In a third example that may include one or both of the first and second examples, the method further comprises generating an opportunity level that is based on whether or not temperature of the traction battery exceeds a threshold. In a fourth example that may include one or more of the first through third examples, the method further comprises delivering the opportunity level to a battery thermal management system.

In another representation, a method for thermal management of a traction battery is provided, comprising: receiving an opportunity assessment and a confidence assessment via a battery thermal management system, and adjusting cooling of a battery according to the opportunity assessment and the confidence assessment. In a first example, the method includes adjusting a position of a valve or pump in response to the opportunity assessment and the confidence assessment. In a second example, the method includes where the confidence assessment is greater when an actual battery temperature is within a threshold temperature of a predicted battery temperature. In a third example, the method includes not adjusting cooling of a battery when the confidence assessment is less than a threshold value. In a fourth example, the method includes adjusting cooling of the battery when the opportunity assessment is greater than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description.

The invention claimed is:

1. A method for thermal management of a traction battery, comprising:
   prior to a traction battery charging event, predicting a temperature of the traction battery before and after the traction battery charging event;
   generating a confidence level for the temperature of the traction battery that is predicted; and
   adjusting cooling of the traction battery in response to the temperature of the traction battery that is predicted and the confidence level.

2. The method of claim 1, further comprising breaking a vehicle travel route into a plurality of segments.

3. The method of claim 2, further comprising predicting the temperature for each segment of the plurality of segments.

4. The method of claim 3, further comprising determining a battery power consumed during each segment of the plurality of segments.

5. The method of claim 4, where the temperature of the traction battery is predicted from a resistive/capacitive model.

6. The method of claim 1, where the confidence level is based on a time or distance to an identified opportunity to cool the traction battery before a threshold temperature is exceeded by the temperature of the traction battery.

7. The method of claim 1, where adjusting cooling of the traction battery includes increasing output of a coolant pump.

8. The method of claim 1, where adjusting cooling of the traction battery includes increasing a fan speed.

9. A system, comprising:
a traction battery;
a cooling system coupled to the traction battery; and
a controller including executable instructions that cause the controller to predict a temperature of the traction battery and generate an opportunity assessment, where the opportunity assessment is based on the temperature of the traction battery being predicted to exceed a threshold temperature, where the temperature of the traction battery is predicted prior to a traction battery charging event and where the temperature of the traction battery is based on time and a segment of a travel route.

10. The system of claim 9, where the segment is based on a time interval.

11. The system of claim 9, further comprising additional executable instructions to estimate a power to propel a vehicle based on the segment.

12. The system of claim 11, where the power to propel the vehicle is based on summing a plurality of segments.

13. The system of claim 9, further comprising additional executable instructions that cause the controller to predict the temperature of the traction battery after the traction battery has been charged via a fast charging station, but prior to the traction battery being charged by the fast charging station.

14. The system of claim 9, further comprising a second controller including executable instructions that cause the controller to adjust operation of the cooling system in response to the temperature of the traction battery that has been predicted.

15. The system of claim 14, where adjusting operation of the cooling system includes activating a pump.

16. A method for thermal management of a traction battery, comprising:
prior to a traction battery charging event, predicting a temperature of the traction battery before and after the traction battery charging event, where the temperature is based on an ambient air temperature;
generating a confidence level for the temperature of the traction battery that is predicted; and
adjusting cooling of the traction battery in response to the temperature of the traction battery that is predicted and the confidence level.

17. The method of claim 16, where the temperature is further based on a battery active heating threshold.

18. The method of claim 17, where the temperature is further based on a battery temperature before fast DC charging of the traction battery.

19. The method of claim 18, further comprising generating an opportunity level that is based on whether or not temperature of the traction battery exceeds a threshold.

20. The method of claim 19, further comprising delivering the opportunity level to a battery thermal management system.

* * * * *